United States Patent [19]

Christiansen et al.

[11] Patent Number: 4,475,039
[45] Date of Patent: Oct. 2, 1984

[54] INFRARED VIEWING APPARATUS

[75] Inventors: Heinrich Christiansen, Achim; Herbert Schneider, Bremen, both of Fed. Rep. of Germany

[73] Assignee: U.S. Philips Corporation, New York, N.Y.

[21] Appl. No.: 404,173

[22] Filed: Aug. 2, 1982

[30] Foreign Application Priority Data

Sep. 23, 1981 [DE] Fed. Rep. of Germany ....... 3137733

[51] Int. Cl.$^3$ ............................................ H01J 31/49
[52] U.S. Cl. .................................................. 250/334
[58] Field of Search ............... 250/330, 332, 334, 338; 358/113, 206

[56] References Cited

U.S. PATENT DOCUMENTS

| | | | |
|---|---|---|---|
| 3,941,923 | 3/1976 | Wheeler | 250/334 |
| 3,949,225 | 4/1976 | Aguilera | 250/334 |
| 4,300,160 | 11/1981 | Pusch et al. | 250/334 |

OTHER PUBLICATIONS

Harth, Manfred, "Warmebildgerate aus—Common Modules—", *Wehrtechnik*, Oct. 1980, pp. 21-23.

*Primary Examiner*—Janice A. Howell
*Attorney, Agent, or Firm*—Marc D. Schechter

[57] ABSTRACT

An apparatus known as a common module for converting a thermal scene into a visible image. The apparatus comprises an infrared objective, a pivotal mirror which can be pivoted back and forth about an axis, an infrared detection array comprising a plurality of detectors, and a linear display array which is connected to the infrared detection array via an amplifier arrangement. The radiation emitted by the display array is imaged in a plane of observation, preferably via the back of the pivotal mirror and via at least one diverting mirror. For omnidirectional viewing in the horizontal and the vertical direction the infrared objective, the pivotal mirror, the detector array and the display array are combined to form a constructional unit, which is arranged to be pivotable about a horizontal and about a vertical axis. Between the diverting mirror and the eyepiece an erecting prism is arranged. The erecting prism is rotated in conformity with the rotation of the constructional unit.

8 Claims, 1 Drawing Figure

INFRARED VIEWING APPARATUS

BACKGROUND OF THE INVENTION

The invention relates to an apparatus for converting a thermal scene into a visible image. The apparatus comprises an infrared objective, a pivotable mirror which can be pivoted back and forth about an axis, an infrared detection array which comprises a plurality of infrared detectors, and a linear display array which is connected to the infrared detection array via an amplifier arrangement. The radiation emitted by the linear display array is imaged in a plane of observation, preferably via the back of the pivotal mirror and via at least one diverting mirror.

Such apparatus is known as a "Common Module" and is described in, for example, an article entitled "Warmebildgerate aus—Common Modules—" by Manfred Hartl (Wehrtechnik, October 1980, pages 21 to 23). In such apparatus, which has a comparatively high resolution, the infrared detection array (to be cooled) is of a comparatively simple construction. The elements for forming the visible image are then physically combined with the infrared optical system and the infrared detection array.

Such apparatus is intended for viewing with a fixed direction of observation. However, it is frequently desired to provide the option of omnidirectional viewing. In conventional periscopes for visible light, in which the eyepiece and hence the plane of observation are fixed, this is achieved by rotating a mirror or a prism. In order to compensate for the image rotation an erecting prism is rotated along through half the angle. However, this principle cannot readily be applied to the present apparatus. This is because if the scanning direction of the pivotal mirror should not be rotated relative to the scene, the prism system which provides compensation for the image rotation would have to be arranged in the radiation path in front of the pivotal mirror. The prism system should then transmit infrared radiation and would therefore be very expensive. Moreover, this placement of the prism system gives rise to special problems because of vignetting, which in the case of viewing devices for visible light are less annoying and can be mitigated largely by simple means.

SUMMARY OF THE INVENTION

It is an object of the invention to provide an infrared viewing apparatus of the type described above which by simple means provides omnidirectional viewing, despite a fixed eyepiece and a fixed plane of observation. The apparatus achieves this without changing the scanning direction of the pivotal mirror relative to the thermal-image scene to be scanned.

To this end, in the apparatus, according to the invention the pivotable mirror, the infrared objective, the infrared detection array and the display array form a constructional unit. The constructional unit is pivotable about a horizontal axis, which extends through a first diverting mirror, and about a vertical axis, which also extends through the diverting mirror. The diverting mirror is disposed at an angle of substantially 45° with respect to each of the two axes, and it is pivotable with the constructional unit about the vertical axis. Between the diverting mirror and the plane of observation there is arranged an image-erecting system, which is moved in conformity with the rotation of the constructional unit. Since the major elements of the apparatus are combined to form a constructional unit which is pivotable about two axes which intersect each other at the diverting mirror, the compensation for the image rotation can be achieved by simple optical means.

In many cases it is effective to combine the infrared viewing apparatus with a viewing apparatus for visible light. Such a combination enables one to observe a scene directly. According to the invention such a combined apparatus is the beam from the objective of the visible-light viewing apparatus to the diverting mirror is oriented at a different angle in the horizontal plane than the radiation from the display array. Changeover from observation of the thermal scene to observation of a visible scene is effected by moving the diverting mirror relative to the constructional unit. In such an embodiment the visible-light viewing apparatus requires few additional elements, especially if the diverting mirror is pivotable about the vertical axis relative to the constructional unit. Thus, changing over from observation of the thermal image scene to observation of the visible scene is particularly simple.

DESCRIPTION OF THE PREFERRED EMBODIMENTS

Figure 1:
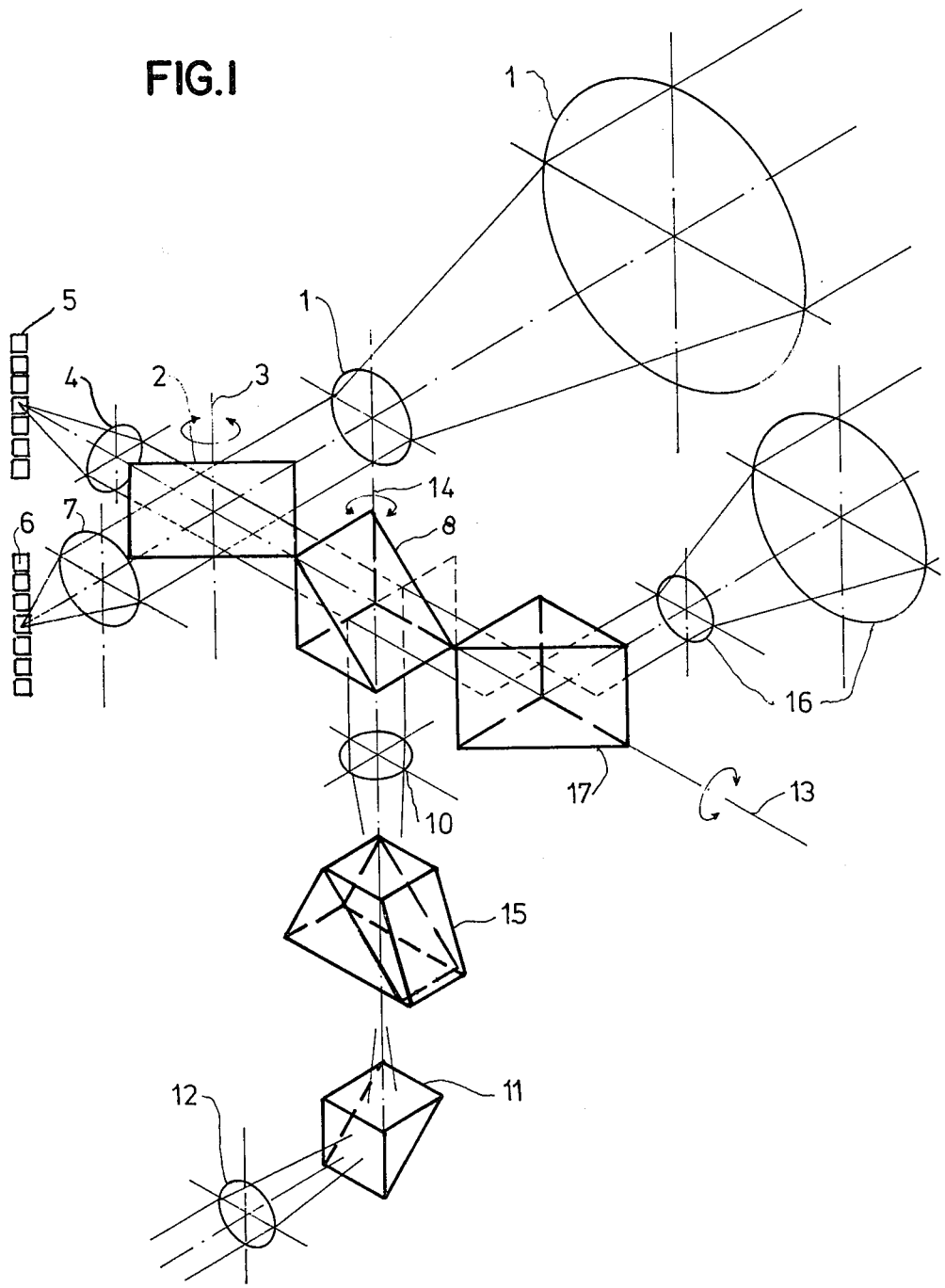
FIG. 1 schematically shows an embodiment of an infrared viewing apparatus according to the invention.

Referring to FIG. 1, an infrared telescope 1 images a thermal scene onto a detector array 5 via a pivotal mirror 2 and an infrared objective 4. The pivotal mirror 2 is pivoted back and forth rapidly about an axis 3 by a drive means, not shown. As a result of this the imaged thermal scene is continuously shifted back and forth over the detector array 5. The detector array 5, which is arranged parallel to the axis 3, therefore scans the thermal scene to be observed line by line.

Via amplifiers (not shown) the infrared detectors 5 are connected to a display device comprising a linear array 6 of, for example, light-emitting diodes. Preferably, the diode array 6 is arranged parallel to the detector array 5, provided that no additional diverting means are arranged before the detector array 5 and/or before the diode array 6. Each infrared detector of the detector array 5 is connected to a corresponding diode of the diode array 6 via an amplifier, so that the diode array 6 visually displays the intensity of the line of the thermal scene being scanned.

Via a lens system 7, the reflecting back of the pivotal mirror 2, a diverting mirror 8 in the form of a prism, a further lens system 10, an image-reversing prism 15, a further diverting mirror 11, and an eye piece 12, the diode array 6 can be viewed by the observer. By the use of the pivotal mirror 2 for diverting both the infrared radiation and the visible radiation, the observer consecutively views the diode array 6 at different locations corresponding with the line of the thermal scene being scanned, so that a visible image of the thermal scene is obtained.

For observation of the scene at a larger angle of elevation the infrared telescope 1, the pivotal mirror 2, the infrared objective 4, the infrared detector array 5, and the visible display device (comprising the diode-array 6 and the associated lens systems) are combined to form a constructional unit which is pivotable about the axis 13. This axis extends through the reflecting surface of the diverting prism 8.

As can be seen in FIG. 1, this rotation does not affect the orientation of the radiation between the pivotal mirror 2 and the diverting prism 8 and the following optical path, but it merely rotates the line orientation of the resulting image. This rotation can be compensated for by a corresponding opposite movement of the image-reversing prism 15. As shown in FIG. 1, the image-reversing prism 15 may be a Schmitt-Pechan prism. By utilizing the image-reversing prism 15, the orientation of the lines being displayed remains constant as viewed by the observer. In this way omnidirectional viewing with an elevation angle of 180° is readily possible.

For omnidirectional viewing in an azimuthal direction, the unit comprising the infrared telescope 1, the pivotal mirror 2, the infrared objective 4, the detector array 5, and the diode array 6 together with the diverting mirror 8 is rotatable about a vertical axis 14. During rotation about this axis 14, the orientation of the radiation is shifted on both sides of the pivotal mirror 2 in the horizontal plane, but after the diverting prism 8 this orientation is not changed. Only the orientation of the diode array 6 changes with the rotation about the axis 14. This rotation of the orientation of the diode array, however, corresponds to the rotation produced during a pivotal movement of the constructional unit about the axis 13, and may therefore also be compensated for by a rotation of the image-reversing prism 15.

Therefore, the prism 15 should be rotated about the axis 14 in both cases, that is both in the case of a rotation of the constructional unit about the axis 13 or about the axis 14. In both cases, prism 15 shuld be rotated through half the angle of rotation of the constructional unit. As a result of this, the orientation of the image of the diode array 6 as viewed by the observer remains constant for a specific viewing direction.

For the combination with a visible-light viewing apparatus there is provided a normal objective 16. The radiation traversing this objective is aimed at the diverting mirror 8 by means of a diverting mirror, prism 17. The diverting mirror 17 is now disposed on the axis 13 and the optical axis of the objective 16 is disposed in the same plane as the axis of the beam to the detector array 5 and as that of the beam between the diode array 6 and the diverting prism 8.

The objective 16 and the diverting prism 17 together with the unit comprises the infrared telescope 1, the pivotal mirror 2, the infrared objective 4, the detector array 5 and the diode array 6 form a larger mechanical unit which can be rotated about the horizontal axis 13 or the vertical axis 14. In order to observe the visible image obtained by means of the objective 16 via the eyepiece 12, the diverting prism 8 can be rotated through 180° about the axis 14 relative to the larger unit, so that it reflects the beam traversing the objective, after which this beam travels to the eyepiece 12 for the observer via the lens system 10, the image-reversing prism 15 and the diverting mirror 11. In order to compensate for the image rotation of the image formed by the objective 16, upon rotation of the larger unit about the horizontal axis 13 or the vertical axis 14, the image-reversing prism 15 should be rotated through half the angle, in the same way as during observation of the thermal scene.

Modifications to the apparatus described with reference to FIG. 1 are possible. For example, the diverting prism 8, which is rotated about the axis 14, may also be rotated about an axis perpendicular to the two axes 13 and 14 relative to the larger unit in order to change over from observation of the thermal scene to observation of the visible scene. Moreover, the image-reversing prism 15 may be arranged at a different location between the diverting prism 8 and the eyepiece 12.

What is claimed is:

1. An apparatus for converting a thermal image of a thermal scene into a visible image, said apparatus comprising:
    an infrared objective for producing a thermal image of the thermal scene;
    an array of infrared detectors;
    a pivotable mirror, arranged to be pivotable back and forth around an axis, for scanning the thermal image across the detector array;
    a display array for emitting visible radiation;
    an amplifier arrangement for varying the amount of radiation emitted by the display array in correspondence with the intensity of the thermal image on the detector array;
    means for producing an image of the display array in a plane of observation; and
    means for scanning the image of the display array across the plane of observation to create a visible image of the thermal scene;
    characterized in that:
    the infrared objective, the detector array, the pivotable mirror, and the display array form a constructional unit, said constructional unit being pivotable about a first axis and a second axis; and
    the apparatus further comprises:
    a first diverting mirror having a reflecting surface, said reflecting surface being disposed at an angle of approximately 45° with respect to the first and second axes, said diverting mirror being pivotable with the constructional unit about the second axis, said diverting mirror being arranged in front of the plane of observation; and
    an image-erecting system arranged between the diverting mirror and the plane of observation, said image-erecting system being arranged to rotate with the constructional unit in such a way that the image of the display array maintains a substantially constant orientation.

2. An apparatus as claimed in claim 1, characterized in that the first axis is a horizontal axis and the second axis is a vertical axis.

3. An apparatus as claimed in claim 1, characterized in that the image-erecting system is arranged to rotate about the second axis.

4. An apparatus as claimed in claim 3, characterized in that the image-erecting system is arranged to rotate through half the angle of rotation of the constructional unit.

5. An apparatus as claimed in claim 4, characterized in that the first axis is a horizontal axis and the second axis is a vertical axis.

6. An apparatus as claimed in claim 5, characterized in that:
    the constructional unit further comprises an objective lens for producing a visible image of the scene whose thermal image is produced by the infrared objective, and a second diverting mirror for reflecting the visible image along the horizontal axis toward the first diverting mirror; and
    the first diverting prism is arranged to be rotatable about the vertical axis with respect to the constructional unit.

7. An apparatus as claimed in claim 1, characterized in that:

the constructional unit further comprises an objective lens for producing a visible image of the scene whose thermal image is produced by the infrared objective, and a second diverting mirror for reflecting the visible image along the first axis toward the first diverting mirror; and the first diverting prism is arranged to be rotatable about the second axis with respect to the constructional unit.

8. An apparatus as claimed in claim 1, characterized in that:

the pivotable mirror has first and second opposite sides, the first side for scanning the thermal image; and the means for scanning the image of the display array comprises the second side of the pivotable mirror.

* * * * *